UNITED STATES PATENT OFFICE.

HARRY R. BUDD AND WILLIAM N. BUDD, OF BUNKER HILL, ILLINOIS.

IMPROVEMENT IN HOG-CHOLERA COMPOUNDS.

Specification forming part of Letters Patent No. 203,319, dated May 7, 1878; application filed August 13, 1877.

To all whom it may concern:

Be it known that we, HARRY R. BUDD and WILLIAM N. BUDD, of the city of Bunker Hill, in the county of Macoupin and State of Illinois, have invented a new and useful Compound called "Hog-Cholera Specific or Cure," which compound is fully described in the following specification:

This invention relates to that class of compounds used in curing cholera in hogs; and it consists of a composition formed by mixing several ingredients together, consisting of mineral, saline, and vegetable substances, the combination of which makes the useful compound.

To prepare the hog-cholera specific or cure, take one pound red madder, one pound flowers of sulphur, one-half pound green copperas, one-quarter of a pound black antimony, one-quarter of a pound nitrate of potassa, and one-quarter of a pound of soda bicarbonate; each of the ingredients to be finely powdered and thoroughly mixed together.

The dose is from one to two ounces, repeated twice in twenty-four hours, as a cure, and from one to two ounces twice a month, as a preventive, to each hog.

We claim as our invention—

A composition for treatment of hog-cholera, consisting of one pound of red madder, one pound of flowers of sulphur, one-half pound green copperas, one-quarter of a pound of black antimony, one-quarter of a pound of nitrate of potassa, and one-quarter of a pound of soda bicarbonate, each of the ingredients finely powdered and thoroughly mixed together.

HARRY R. BUDD.
WM. N. BUDD.

Witnesses:
F. Y. HEDLEY,
A. N. YANCEY.